(12) United States Patent
Laine et al.

(10) Patent No.: US 9,753,494 B2
(45) Date of Patent: Sep. 5, 2017

(54) ELECTRONIC DEVICE ACCESSORY WITH AT LEAST ONE PORT

(71) Applicant: HEWLETT-PACKARD DEVELOPMENT COMPANY, L.P., Houston, TX (US)

(72) Inventors: Aki Laine, Houston, TX (US); Dimitre Mehandjiysky, Houston, TX (US); Michael Delpier, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/035,277

(22) PCT Filed: Nov. 26, 2013

(86) PCT No.: PCT/US2013/071873
§ 371 (c)(1),
(2) Date: May 9, 2016

(87) PCT Pub. No.: WO2015/080695
PCT Pub. Date: Jun. 4, 2015

(65) Prior Publication Data
US 2016/0291639 A1     Oct. 6, 2016

(51) Int. Cl.
*G06F 1/16*     (2006.01)
(52) U.S. Cl.
CPC .......... *G06F 1/1632* (2013.01); *G06F 1/1626* (2013.01); *G06F 1/1628* (2013.01);
(Continued)

(58) Field of Classification Search
CPC .... G06F 1/1628; G06F 1/1632; G06F 1/1633; G06F 2200/1634
See application file for complete search history.

(56) References Cited

U.S. PATENT DOCUMENTS

| | | | |
|---|---|---|---|
| 7,191,926 B1 * | 3/2007 | Costantino | A45C 3/02 190/102 |
| 8,228,323 B2 * | 7/2012 | Bandel | G06F 1/1626 345/211 |

(Continued)

FOREIGN PATENT DOCUMENTS

WO    WO-2005007514 A1    11/2005

OTHER PUBLICATIONS

"Buy Kensington KeyFolio Pro 2 Performance Case for iPad 4 with Retina Display, New iPad (3rd Gen) and iPad 2 (K39638US)", Nov. 18, 2012.

(Continued)

*Primary Examiner* — Anthony Q Edwards
(74) *Attorney, Agent, or Firm* — HP Patent Department

(57) ABSTRACT

An electronic device accessory is provided in accordance with an aspect of the present disclosure. The electronic device accessory comprises an elongated member including at least one port and a releasable attachment mechanism embedded in the elongated member to couple an electronic device to a portion of the elongated member. The electronic device accessory further includes a top cover extending from a first edge of the elongated member to cover a first side of the electronic device and a bottom cover extending from a second edge of the elongated member to cover a second side of the electronic device.

15 Claims, 4 Drawing Sheets

(52) U.S. Cl.
CPC ........... *G06F 2200/1633* (2013.01); *G06F 2200/1634* (2013.01)

(56) References Cited

U.S. PATENT DOCUMENTS

| | | | |
|---|---|---|---|
| 8,344,836 B2 | 1/2013 | Lauder et al. | |
| 8,390,412 B2 | 3/2013 | Lauder et al. | |
| 8,467,183 B2* | 6/2013 | Probst | G06F 1/1616 345/168 |
| 8,811,008 B2* | 8/2014 | Selkirk | G06F 13/4081 312/245 |
| 9,326,404 B1* | 4/2016 | Wood | G09G 5/003 |
| 2007/0051766 A1* | 3/2007 | Spencer | A45C 11/00 224/607 |
| 2007/0119734 A1 | 5/2007 | Pichahchi | |
| 2009/0219271 A1* | 9/2009 | Bandel | G06F 1/1626 345/211 |
| 2009/0244009 A1* | 10/2009 | Staats | G06F 1/162 345/168 |
| 2011/0204843 A1* | 8/2011 | Foster | A45C 11/00 320/101 |
| 2011/0222238 A1* | 9/2011 | Staats | G06F 1/1632 361/679.55 |
| 2012/0194448 A1 | 8/2012 | Rothkopf | |
| 2012/0314354 A1* | 12/2012 | Rayner | H01H 13/06 361/679.01 |
| 2013/0020216 A1* | 1/2013 | Chiou | G06F 1/1626 206/320 |
| 2013/0221048 A1 | 8/2013 | Revels et al. | |
| 2013/0258573 A1 | 10/2013 | Muday et al. | |
| 2013/0301204 A1* | 11/2013 | Yim | G06F 1/1601 361/679.26 |
| 2013/0322013 A1* | 12/2013 | Steele | A45C 11/00 361/679.55 |
| 2014/0028865 A1* | 1/2014 | Ohtaka | H04N 5/23203 348/211.4 |
| 2014/0117192 A1* | 5/2014 | Huang | F16M 11/10 248/346.04 |
| 2014/0273590 A1* | 9/2014 | Sharma | G06F 1/1669 439/350 |
| 2016/0191103 A1* | 6/2016 | Balaji | B65D 25/00 455/575.8 |

OTHER PUBLICATIONS

"New Calfskin Soft Leather Water Resist Protective Case Cover Stand for iPad3", Aug. 9, 2013.

* cited by examiner

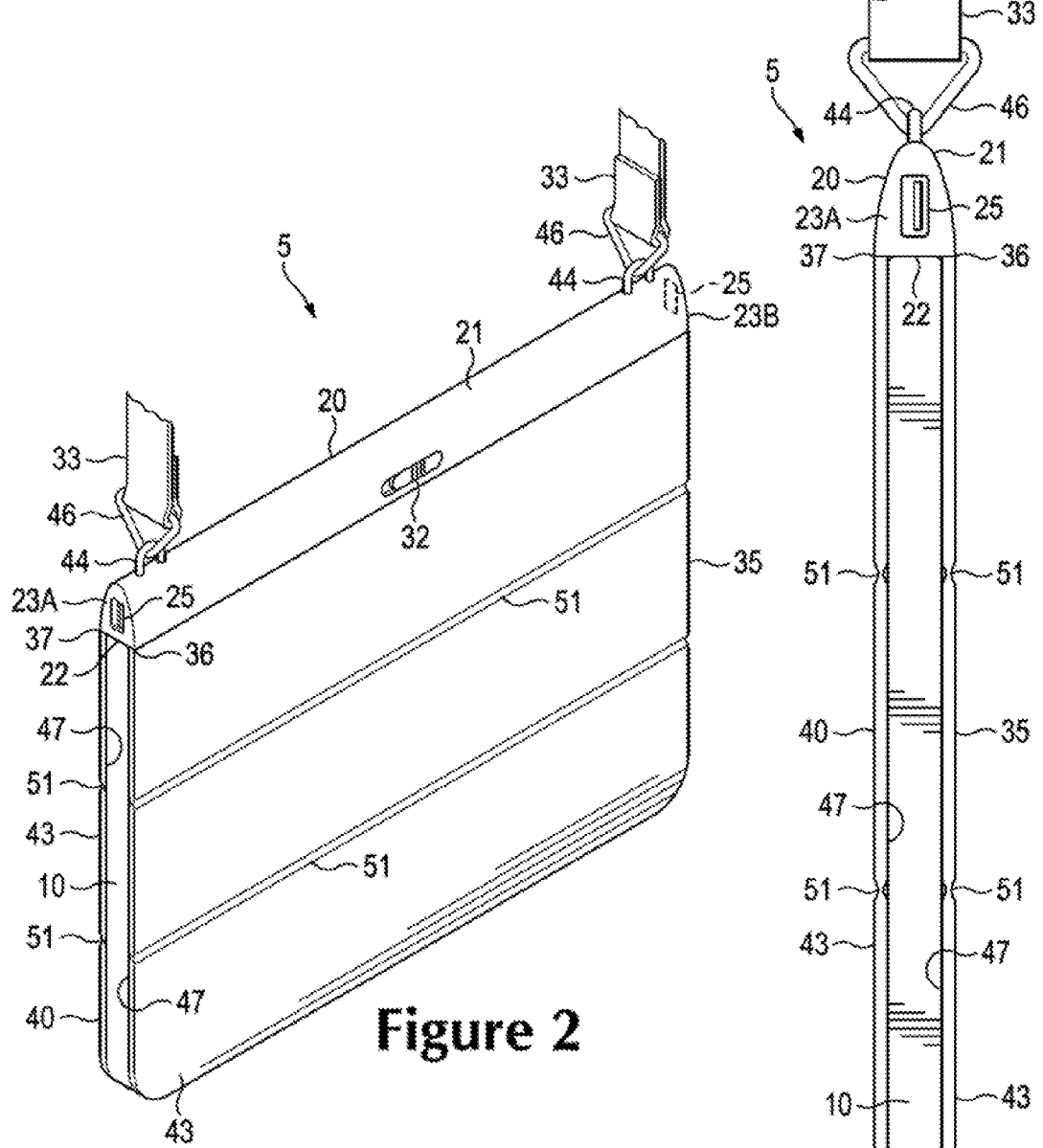

ELECTRONIC DEVICE ACCESSORY WITH AT LEAST ONE PORT

BACKGROUND

Increasing number of today's users carry at least one portable electronic device that is equipped with a diverse set of functions. These devices can communicate with each other, reach the Internet, perform different tasks, or access various services through networks. These portable electronic devices have become essential personal accessories, connecting users to friends, work, and entertainment.

BRIEF DESCRIPTION OF THE DRAWINGS

FIG. 2 is a perspective view of the electronic device accessory of FIG. 1 in a closed position according to an example implementation.

FIG. 3 is a side view of the electronic device accessory of FIG. 1 according to an example implementation.

DETAILED DESCRIPTION

Figure 1:
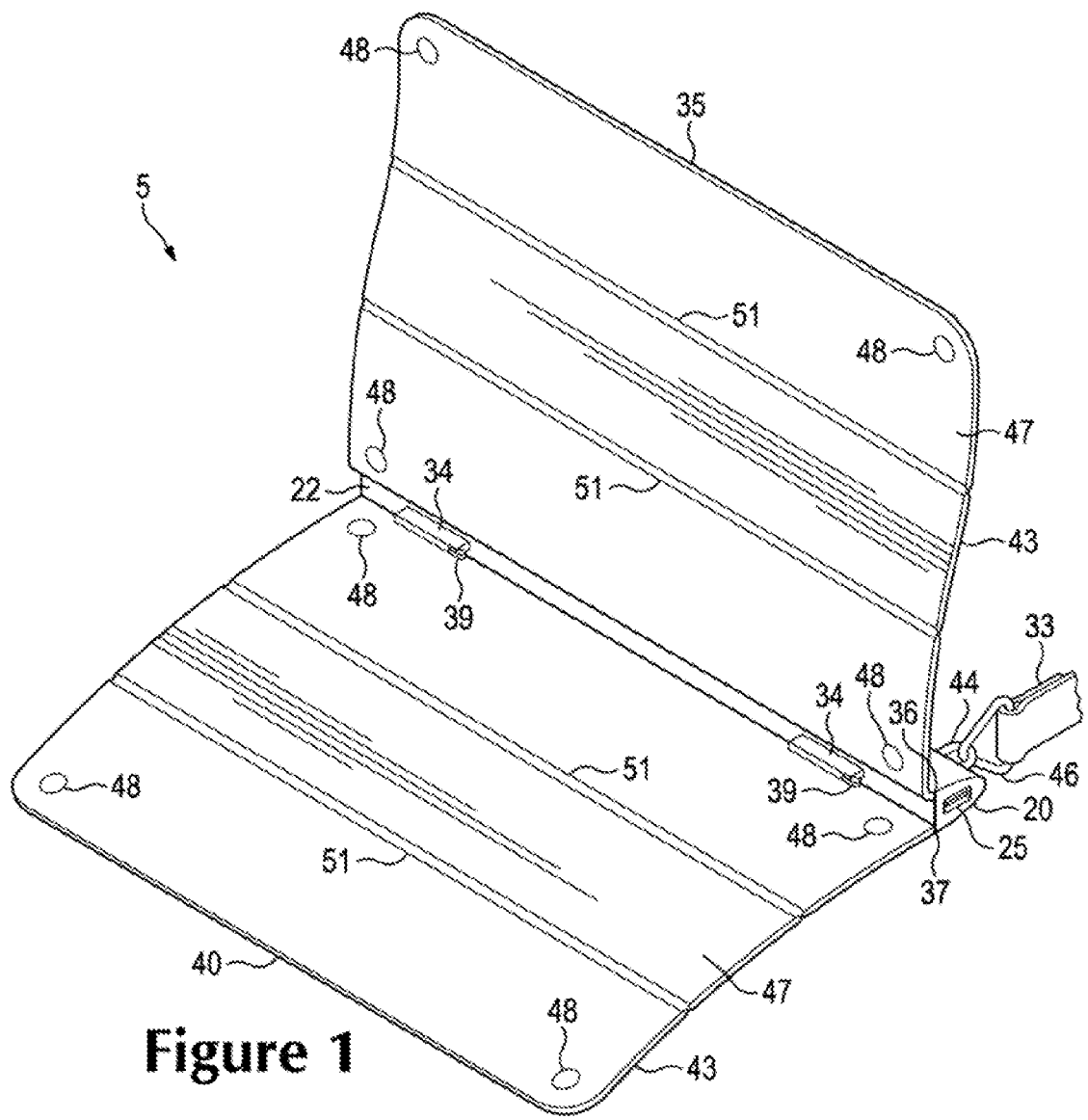
FIG. 1 is a perspective view of an electronic device accessory in an open position according to an example implementation.

With the recent improvements in technology, portable electronic devices (e.g., tablets, laptops, smartphones, etc.) continue to play an increasing role in people's life. Different users rely on different type of portable electronic devices for many day-to-day activities and work related tasks.

Portable electronic devices come in different sizes, forms, and may include different technical features. Some portable electronic devices are configured as smartphones or tablets and include a touchscreen as their main input interface. Other portable electronic devices are configured as notebooks (e.g., laptops) and include a keyboard portion (i.e., housing) that is attached lo a display screen (that may or may not be touch sensitive). In addition, portable electronic devices may also be configured as convertible electronic devices that include a keyboard/battery portion and a display screen portion. When the display screen portion of these devices is docked or attached to the keyboard/battery portion, these devices operate as a laptop and the screen may rotate relative to the keyboard/battery portion. On the other hand, when the display screen portion is not docked (i.e., it is detached from the keyboard/battery portion), these devices operate as handheld devices and a user may rotate their screens between different orientations.

Regardless of the type of portable electronic devices, one of the main advantages of these devices is portability. Thus, users generally carry these devices on a daily basis between many different locations. This creates a risk of damaging the portable devices if the devices are scratched, dropped, stepped on, hit, etc. Consequently, it is desirable to use protective accessories (e.g., bags, cases, covers, etc.) when carrying such portable electronic devices. It is also desirable that such protective accessories are convenient to carry and they securely engage the portable electronic devices when the devices are inserted in these accessories. Specifically, a secure attachment between the portable electronic devices and the protective accessories is very important because users generally carry the portable electronic devices by holding the protective accessories (or at least a portion of the protective accessories). Thus, if the electronic devices are not securely connected to the protective accessories, the electronic device may detach from the protective accessory and may be damaged.

In addition, there is a tendency that many of the new portable electronic devices are constructed to be very thin. This is due to user's demand for light portable electronic devices that are easy to carry and do not take up too much space. Constructing a thin portable electronic device usually means that the device includes a housing with a very small width (e.g., 0.29-0 40 inches, etc.). One disadvantage of constructing very thin portable electronic devices is that such devices can not include many standard input/output ("I/O") ports (e.g., a High-Definition Multimedia Interface (HDMI) port, a Universal Serial Bus (USB) port, etc,) that are available in other types of electronic device (e.g., desktop computers, etc.). That limits the functionality of the portable electronic devices and makes them less desirable.

The present description is directed to a protective accessory for an electronic computing device. Specifically, the description proposes a novel and previously unforeseen protective accessory that securely engages an electronic device positioned in the protective accessory via a releasable attachment mechanism and covers both sides of the electronic device. The proposed protective accessory also includes carrying straps that enable a user to conveniently carry the accessory and the electronic device. The accessory described below further includes various elements (e.g., I/O ports, dock connector, etc.) that allow the protective accessory to interact with the attached electronic device and also to provide enhanced connectivity of the electronic device when the device is attached to the protective accessory.

Therefore, the proposed electronic device accessory provides secure attachment with an electronic device and protects the attached electronic device while the device is carried by a user. In addition, via the plurality of embedded connectors and ports, the proposed accessory enhances the connectivity of the attached electronic device without the need to detach the accessory from the device.

In an example implementation, an electronic device accessory is provided. The electronic device accessory includes an elongated member including at least one port. The electronic device accessory also includes a releasable attachment mechanism embedded in the elongated member to couple an electronic device to a portion of the elongated member. The electronic device accessory further includes a top cover extending from a first edge of the elongated member to cover a first side of the electronic device, and a bottom cover extending from a second edge of the elongated member to cover a second side of the electronic device In another example implementation, a protective accessory for a portable electronic device includes a first protective member to be positioned over a first side of the portable electronic device and a second protective member to be positioned over a second side of the portable electronic device. The protective accessory further includes a support member engaging the first protective member and the second protective member. The supportive member includes a releasable attachment mechanism positioned at a bottom portion of the support member and a dock connector embedded in the bottom portion of the support member.

As used herein, the terms "portable electronic device" and "electronic device" may be used interchangeably and refer to any one of various smartphones, cellular telephones, tablets, personal data assistants (PDA's), laptops, computers, and other similar electronic devices that are generally movable and include at least a housing, a display screen, and a processor.

As used herein, the term "dock connector" refers to a connector used to attach an object (e.g., device) to an external resource or device. The dock connector may be a male connector that includes at least one exposed pin or a female connector that includes opening(s) in which the male connector may be inserted. A dock connector carries a variety of signals and power to simplify the process of docking the object and communication between the object and the external resource. A dock connector may be embedded in a mechanical fixture used to support or align a device or may be positioned at the end of a cable.

As used herein, the terms "post" refers to any one of various openings that may be included in a device and may include any of I/O or communication ports, multimedia ports, power ports, audio ports or jacks, memory card readers, or any other openings or ports that allow for communication and/or interaction with external devices or objects.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

With reference to the figures, FIG. 1 is perspective view of an electronic device accessory 5 (also called a protective accessory) for a portable electronic device 10 (show in FIGS. 2-4), according to an example implementation. The electronic device accessory 5 of FIG. 1 is shown in an open position. The protective accessory 5 includes an elongated support member 20, a releasable attachment mechanism embedded in the elongated support member 20 member to couple an electronic device to a portion of the elongated member 20, a top cover 35 (also called a first protective member) extending from a first edge 38 of the elongated member to cover a first side of the electronic device, and a bottom cover 40 (also called a second protective member) extending from a second edge 37 of the elongated member to cover a second side of the electronic device. In addition, the protective accessory 5 includes at least one carrying strap 33 attached to a portion of the accessory 5 to assist a user in carrying the accessory 5 and the attached electronic device.

The specific details of the proposed protective accessory 6 are explained in relation to FIGS. 1-3. FIG. 2 is a perspective view of the electronic device accessory 5 in a closed position according to an example implementation and FIG. 3 is a side view of the electronic device accessory 5 of FIG. 1 according to an example implementation. FIGS. 2 and 3 also show an electronic device 10 that is attached to the electronic device accessory 5.

As shown in FIGS. 1-3, the elongated support member 20 of the protective accessory 5 securely engages the top cover 35 and the bottom cover 40 (e.g., via an adhesive or any other suitable attachment mechanism) and provides support of the covers 35 and 40 when the accessory 5 is in open or closed position. The support member 20 includes a curved top portion 21, a flat bottom portion 22, and two side portions 23A and 238. The support member 20 may be constructed from different types of rigid material (e.g., polished metal, aluminum, plastic, etc.) to provide support to the other elements of the accessory 5 and to the electronic device. As explained in additional details below, the support member 20 is constructed from a material that is more rigid than the material used to construct the protective members 35 and 40.

The elongated support member 20 includes at least one port 25 embedded in the support member 20. For example the support, member 20 includes a first port 25 positioned on the first side portion 23A and a second communicating port 25 positioned on the second side portion 23B. Alternatively, more than one commination port may be positioned on either of the side portions 23A/23B. In another example, ports may also be positioned on different portions of the elongated support member 20 (e.g., on the top portion 21, on the bottom portion 22, etc.).

The ports 25 may include any type of port or opening that allow for communication and/or interaction with external devices or objects. For example, the ports may include an HDMI port (e.g., full size HDMI, mini HDMI, micro HDMI etc.), a USB port (e.g., full size USB, mini USB, micro USB, power USB), a Thunderbolt port, a memory card reader slot, a DC power jack, a RJ-45 port, an audio Jack or port (e.g., for headphone, microphones, etc.) or any other type of port. The electronic device accessory 5 (e.g., at the support member 20) may also include various buttons or keys (e.g., power, volume, etc.), as well as different display or indicators (e.g., to indicate charging, low battery, etc.). As explained in additional details below, the support member 20 may further include connecting elements (e.g., a dock connector) as well as electronic elements or circuits (not shown) that can facilitate the interaction between the protective accessory 5 and the electronic device 10. For example, the elongated support member 20 may further include a dock connector 45 (show in FIG. 4) to attach to a corresponding connector opening of the electronic device 10.

The at least one port 25 provides enhanced connectivity of the electronic device 10 when the device is attached to the protective accessory 5. For example, the electronic device may receive power through one of the ports 25 and a user may power charge the electronic device 10 without detaching the accessory 5 from the device 10. In yet another example, the elongated support member 20 may also include other type of connectors or ports (e.g., mouse connector, parallel port, serial port, etc.) that may support the operation of the electronic device 10 when attached to the accessory 5.

Figure 4:
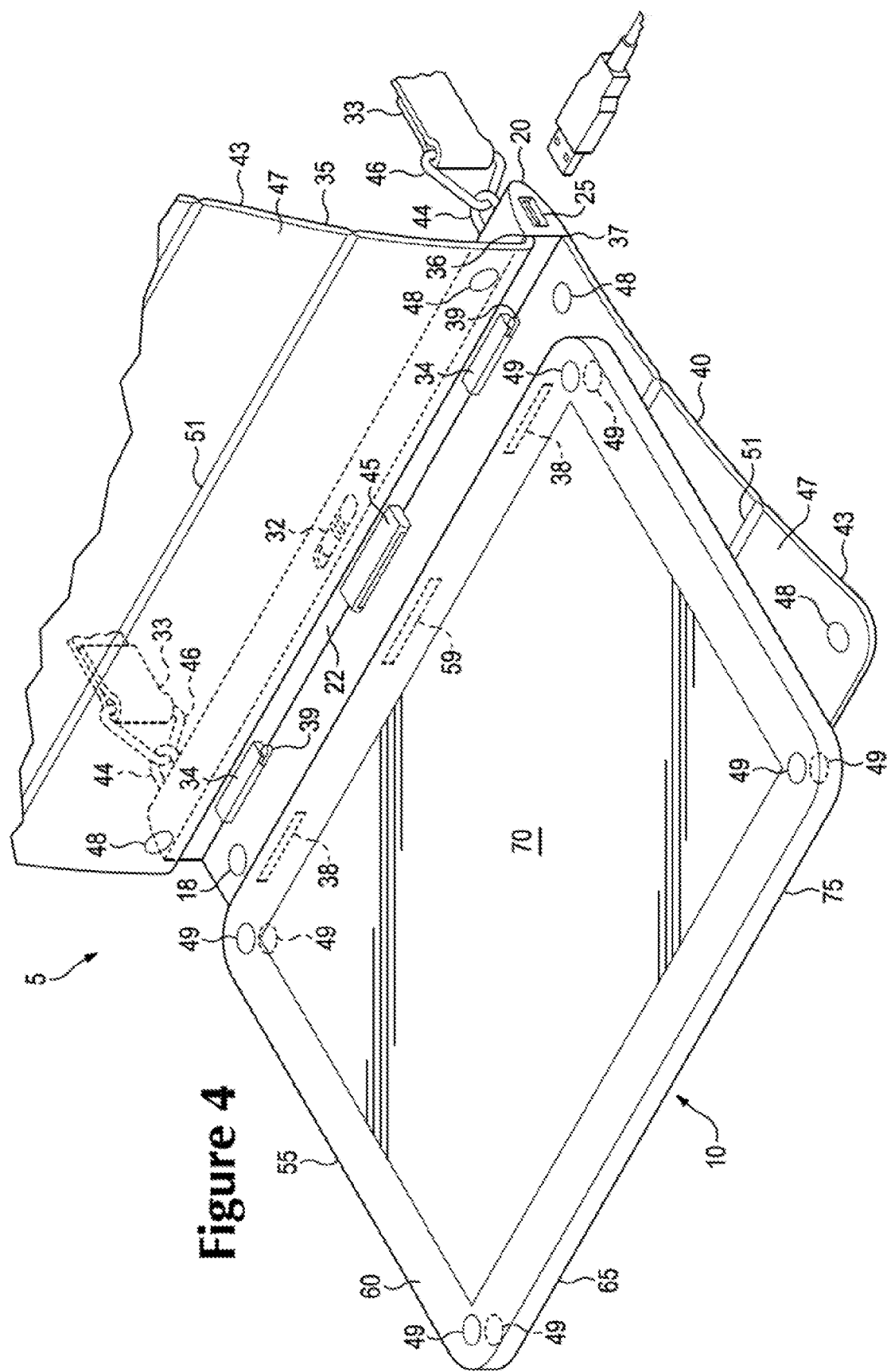
FIG. 4 is a perspective view of an electronic device accessory according to an example implementation.

In one example, the releasable attachment mechanism embedded in the elongated support member 20 includes at least one attachment connector or pin 34 extending upwardly from the bottom portion 22 of the elongated member 20 to engage at least one opening 38 of the electronic device 10 (shown in FIG. 4). In the illustrated example, the releasable attachment mechanism includes two pins 34 that engage one end of the portable electronic device 10 (i.e., via openings 38) when the portable electronic device 10 is attached to the protective accessory.

In some implementations, the pins 34 of the releasable attachment mechanism may include a sliding latch 39 to slide into the corresponding openings of the device 10 and to engage a latch hook (not shown) for secured attachment of the protective accessory 5 to the electronic device 10. Further, the pins 34 may also include at least one polar magnet (not shown) to attach to an opposite polar magnet positioned at the corresponding openings of the device 10. In other examples, the protective accessory 5 may include other types of releasable attachment mechanisms to directly attach/detach the accessory 5 to the device 10. Such mechanisms may include magnets (only), fasteners, clips, hoops, or any other mechanism or combination of mechanisms that allows for a secure attachment of the electronic device accessory 5 to the device 10. Regardless of the type of attachment mechanism that is used, there is always a strong mechanical connection between the protective accessory 5 and the electronic device 10. This mechanical connection provides secure attachment of the electronic device 10 to the protective accessory 5 and thus protects the attached device from detaching while the accessory is carried by a user.

The attachment mechanism further includes a release mechanism 32 to release the attachment between the least one attachment pin 34 and the electronic device 10. In one example, the release mechanism 32 is positioned in the elongated support member 20 (e.g., in the top portion 21) so it is easily accessible to a user. The release mechanism 32 is mechanically connected to the at least one attachment pin 34 so when a user operates the mechanism 32, corresponding elements (not shown) are activated to disengage the at least one pin 34 from the corresponding opening 38 of the device 10 (e.g., by pulling the attached latch 39 from the latch hook). The release mechanism 32 may be a sliding mechanism, a push button, a solenoid, or any other type of release mechanism that is designed to disengage the protective accessory 5 from the electronic device 10. In another example, the release mechanism 32 may be positioned in the bottom portion 22 of the elongated support member 20 or in any of the two side portions 23A and 23B.

At least one carrying strap 33 is attached to the elongated support member 20. In one example, pegs 44 extend from the top portion 21 of the elongated member 20 and engage pegs 46 of the carrying stripe 33. In another example, different types of coupling mechanisms for attaching the carrying stripe 33 to the elongated support member 20 may be used. Alternatively, the carrying stripe 33 may be attached to any of the covers 35 or 40.

In one example the protective accessory 6 may include only one protective cover (e.g., the cover 35) to cover one side of an electronic device (e.g., a display screen). In other examples, two protective covers are included in the protective accessory 5. The top protective cover 35 of the protective accessory 5 extends from the first edge 36 of the support member 20 and the bottom protective cover 40 extends from the second edge 37 of the support member 20. The covers 35 and 40 include an outer surface 43 and an inner surface 47. When a portable electronic device 10 is coupled to the electronic device accessory, the first protective member 35 is positioned over a first side of the portable electronic device and the second protective member is positioned over a second side of the portable electronic device. For example, the covers 35 and 40 include a plurality of magnetic members 48 positioned on the inner surfaces 47 of the covers 35 and 40. These members 48 magnetically attach to corresponding magnets 49 on the electronic device 10. Alternatively, the magnets 48 may attach to the surface of a device 10 that does not include any magnets.

The protective members or covers 35 and 40 may have different forms and sizes but they ultimately cover both sides of an electronic device (or at least a substantial portion of the device). That way, the covers 35 and 40 protect both sides of an electronic device 10. The protective covers 35 and 40 may be constructed from various types of protective material (e.g., silicone, leather, thermoplastic polyurethane (TPU), felt bamboo, cork, fiber, etc,) or may be any other type of flexible material that is bendable and can protect a screen of an electronic device.

The covers 35 and 40 may correspond to the shape of the attached electronic device and may be constructed from a material that is more flexible than the material of the elongated support member 20. Thus, each of the covers 35 and 40 may bend along lines 51 in order to progressively fold the covers 35 and 40 into smaller segments. When one of the covers 35 and 40 is folded into a plurality of smaller segments, that cover may be used to support the elongated member 20, and consequently the electronic device 10, into an upright position so a user can easily view or operate the device 10. In an alternative example, the covers 35 and 40 may be constructed from a different material and may not bend (not shown in the figures).

FIG. 4 is a perspective view of the electronic device accessory 5 and an electronic device 10 to be attached to the electronic device accessory 5 according to an example implementation. The electronic device accessory 5 illustrated in FIG. 4 includes many of the same elements as the protective accessory 5 shown in FIGS. 1-3. The electronic device accessory 5 of FIG. 4 includes the first protective member 35 to be positioned over a first side of the portable electronic device 10, the second protective member 40 to be positioned over a second side of the portable electronic device 10, and the support member 20 engaging the first protective member 35 and the second protective member 40. The supportive member 20 includes a releasable attachment mechanism (e.g., pins 34 described above) positioned at the bottom portion 22 of the support member. In addition, the electronic device accessory 5 of FIG. 4 includes a dock connector 45 embedded in the bottom portion of the support member 20. The dock connector 45 extends upwardly from the elongated member 20 to attach to a corresponding connector opening 59 of the electronic device 10.

The electronic device 10 illustrated in FIG. 4 may be a portable electronic device (e.g., a tablet, etc.) or a convertible electronic device (e.g., a conversable laptop). For example, the electronic device 10 may be a tablet, a laptop, an all in one computing device, a gaming console, a mobile telephone, a music player, a visual player, a personal digital assistant (PDA), an electronic notepad, or any other suitable electronic device that includes a housing, a display screen, and a processor. In the illustrated example, the electronic device 10 includes a housing 55 having a first side 80 and a second side 65. The first side 80 includes a display 70 and the second side 65 a base 75. The display 70 may be substantially rectangular. In another example, the first side 80 may also include additional components (e.g., a keyboard, etc.).

The housing 55 may be constructed from metal, plastic, fiber resin, or another suitable material. The housing 55 may include resistance increasing components (i.e., legs, not shown) on a bottom surface of the base 75 for placing the electronic device on a surface such as a desk or table. The housing 55 may also include components of the electronic device 10 such as a processor, memory, a printed circuit board, battery, or other applicable components (not shown). The display 70 may be an LCD (Liquid Crystal Display), OLED (organic light emitting display) or another type of display. The display may be a touchscreen display that can be controlled by the user through simple or multi-touch gestures by touching the screen with at least one finger.

The housing 55 of the device 10 further includes the connector opening 59. The connector opening 59 may be positioned on different portions of the housing 55 depending on the type and the configuration of the electronic device 10. The dock connector 45 is to engage the connector opening 59 at the appropriate end of the portable electronic device 10 when the device 10 is attached to the protective accessory 5. Therefore, the protective accessory 5 may be constructed for and coupled to any type of portable electronic device 10. The dock connector 45 and the ports 25 enhance the connectivity of the device 10 while the device is attached to the protective accessory 5. In addition, the dock connector 45 enhances the security of attachment between the protective accessory 5 and the electronic device 10.

Figure 5:
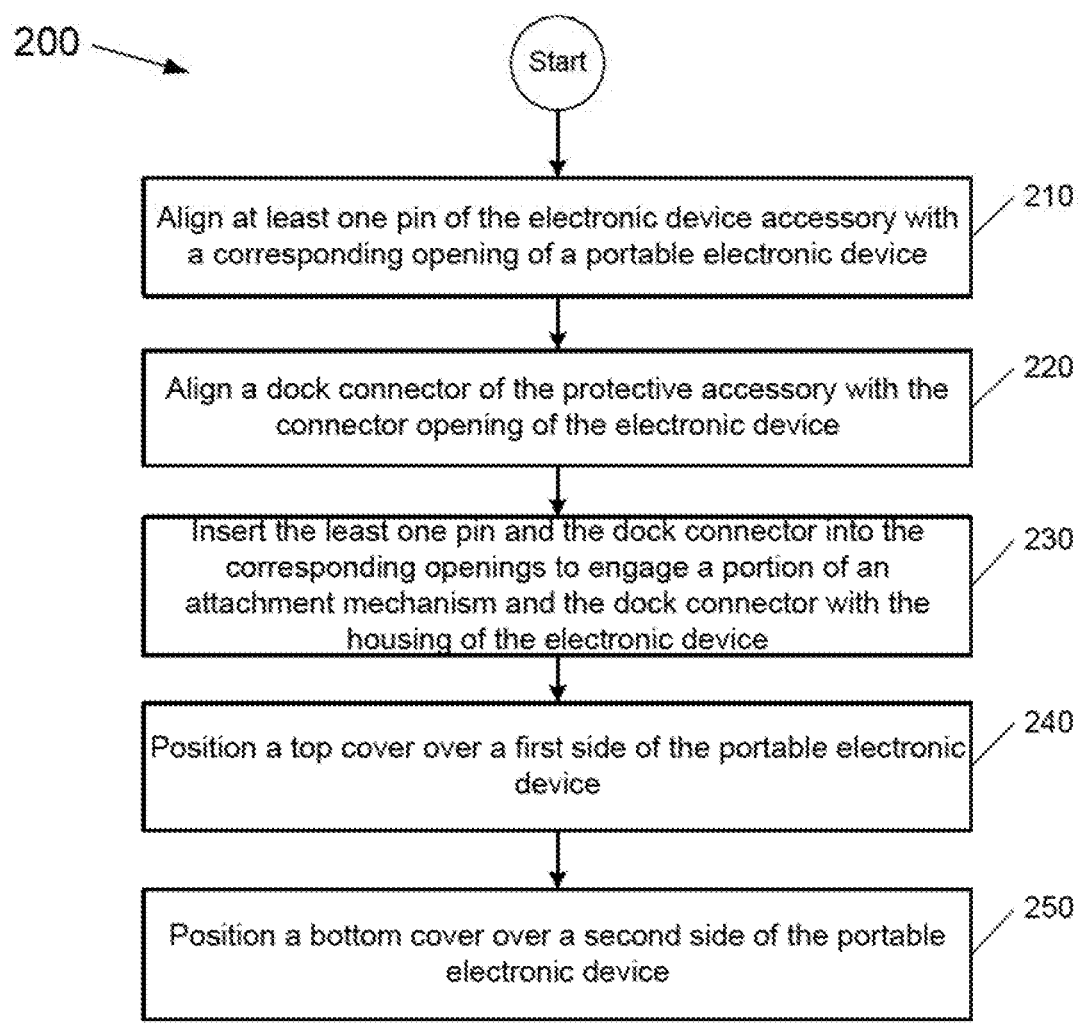
FIG. 5 is a flow chart of a method of attaching the electronic device accessory of FIG. 4 to an electronic device according to an example implementation.

FIG. 5 is a flow chart of a method 200 of attaching the electronic device accessory 5 to the electronic device 10 according to an example implementation. The method 200 may be practiced with the electronic device accessory 5 of FIG. 4 and with any type of electronic device 10.

The method 200 aligns the at least one pin 34 of the electronic device accessory 5 with the corresponding opening 38 of the electronic device 10 (at 210). Then, the method 200 aligns the dock connector 45 of the electronic device accessory 5 with the connector opening 59 of the electronic device 10 (at 220). At 230, the at least one pin 34 and the dock connector 45 are inserted into the corresponding openings 38 and 59 such that a portion of the attachment mechanism (e.g., pins 34 and latches 30) and the dock connector 45 securely engage the housing 65 of the electronic device 10. The top cover 36 is then positioned over the first side 80 of the portable electronic device 10 (at 240), and the bottom cover 40 is positioned over the second side 65 of the portable electronic device 10 (at 250).

What is claimed is:

1. An electronic device accessory, comprising:
   an elongated member including at least one port;
   a releasable attachment mechanism embedded in the elongated member to couple an electronic device to a portion of the elongated member; and
   a top cover extending from a first edge of the elongated member to cover a first side of the electronic device.

2. The electronic device accessory of claim 1, wherein the elongated member further includes a dock connector extending upwardly from the elongated member to attach to a corresponding connector opening of the electronic device.

3. The electronic device accessory of claim 1, wherein the releasable attachment mechanism includes at least one attachment pin extending upwardly from the elongated member to engage at least one opening of the electronic device.

4. The electronic device accessory of claim 3, wherein the elongated member further includes a release mechanism to release the attachment between the at least one attachment pin and the electronic device.

5. The electronic device accessory of claim 1, wherein the elongated member is constructed from a first material and the covers are constructed from a second material that is more flexible than the first material.

6. The electronic device accessory of claim 1, further comprising a bottom cover extending from a second edge of the elongated member to cover a second side of the electronic device, and at least one carrying strap attached to a portion of the electronic device accessory.

7. The electronic device accessory of claim 1, further comprising a plurality of magnetic members positioned on an inner surface of the top cover and the bottom cover to magnetically attach to a surface of the electronic device.

8. A protective accessory for a portable electronic device, the protective accessory comprising:
   a first protective member to be positioned over a first side of the portable electronic device;
   a second protective member to be positioned over a second side of the portable electronic device; and
   a support member engaging the first protective member and the second protective member, the supportive member comprising:
     a releasable attachment mechanism positioned at a bottom portion of the support member, and
     a dock connector embedded m the bottom portion of the support member.

9. The protective accessory of claim 8, further comprising at least one port embedded in the support member.

10. The protective accessory of claim 8, wherein the releasable attachment mechanism is to engage a first end of the portable electronic device when the portable electronic device is attached to the protective accessory.

11. The protective accessory of claim 10, wherein the dock connector is to engage a connector opening at the first end of the portable electronic device when the portable electronic device is attached to the protective accessory.

12. An electronic device accessory, comprising:
    an elongated support member including a dock connector and at least one port;
    a top protective member extending from the e ion gated support member to cover a first side of a portable electronic device;
    a bottom protective member extending from the elongated support member to cover a second side of the portable electronic device; and
    a releasable attachment mechanism embedded in the elongated support member to engage the portable electronic device when the portable electronic device is placed in the accessory.

13. The electronic device accessory of claim 12, wherein the releasable attachment mechanism includes at least one connector extending from the elongated member to couple with at least opening of the electronic device, and the elongated support member includes a release mechanism to release the attachment between the least one connector and the electronic device.

14. The electronic device accessory of claim 12, wherein the elongated member is constructed from a first material that is more rigid than a second material used to construct the protective members.

15. The electronic device accessory of claim 12, further comprising at least one carrying strap attached to a portion of the electronic device accessory.

* * * * *

UNITED STATES PATENT AND TRADEMARK OFFICE
CERTIFICATE OF CORRECTION

| | |
|---|---|
| PATENT NO. | : 9,753,494 B2 |
| APPLICATION NO. | : 15/035277 |
| DATED | : September 5, 2017 |
| INVENTOR(S) | : Aki Laine et al. |

It is certified that error appears in the above-identified patent and that said Letters Patent is hereby corrected as shown below:

In the Drawings

In Sheet 4 of 4, Figure 5, reference numeral 230, Line 1, delete "least" and insert -- at least --, therefor.

In the Claims

In Column 8, Line 21, in Claim 8, delete "m" and insert -- in --, therefor.

In Column 8, Line 36, in Claim 12, delete "e ion gated" and insert -- elongated --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*